United States Patent [19]
Cossins et al.

[11] Patent Number: 5,949,320
[45] Date of Patent: Sep. 7, 1999

[54] SELF FUSING SOLENOID COIL

[75] Inventors: James M. Cossins, Taylor; Mark C. Pinkowski, Livonia, both of Mich.

[73] Assignee: Kelsey-Hayes Company, Livonia, Mich.

[21] Appl. No.: 08/994,619

[22] Filed: Dec. 19, 1997

Related U.S. Application Data

[60] Provisional application No. 60/033,688, Dec. 19, 1996.

[51] Int. Cl.⁶ .................................................. H01F 27/28
[52] U.S. Cl. ..................... 336/223; 336/105; 336/192; 336/198; 336/222; 361/41; 303/119.2
[58] Field of Search .................................. 336/105, 223, 336/192, 198, 222; 361/41; 303/119.2

[56] References Cited

U.S. PATENT DOCUMENTS

| | | |
|---|---|---|
| 3,585,450 | 6/1971 | Lane .......................................... 317/15 |
| 4,284,319 | 8/1981 | Bernstein . |
| 4,414,528 | 11/1983 | Bernstein . |
| 4,587,548 | 5/1986 | Grabbe et al. . |
| 4,828,335 | 5/1989 | Fuller et al. ............................. 303/100 |
| 4,865,399 | 9/1989 | Atkins et al. ............................ 303/116 |
| 5,304,740 | 4/1994 | Bozell et al. . |
| 5,361,057 | 11/1994 | Ito et al. .................................. 336/198 |

*Primary Examiner*—Lincoln Donovan
*Assistant Examiner*—Tuyen T. Nguyen
*Attorney, Agent, or Firm*—MacMillan, Sobanski and Todd, LLC

[57] ABSTRACT

A portion of a solenoid coil melts after a predetermined time period has elapsed to interrupt the flow of current through the coil. The portion which melts can include a reduced cross sectional area which increases the resistance of the portion of the wire. Alternately, a portion of the coil wire can be formed from a material having a higher resistivity than the remainder of the wire.

22 Claims, 3 Drawing Sheets

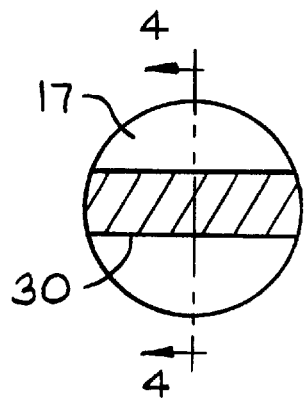 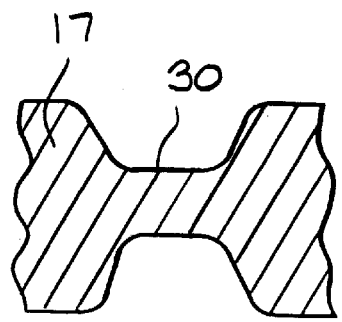
FIG. 3  FIG. 4
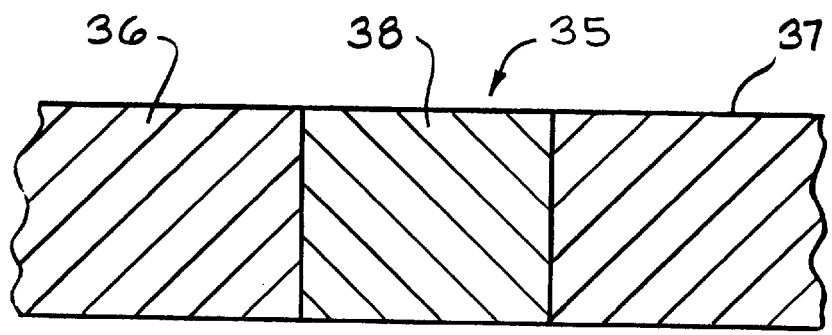
FIG. 5
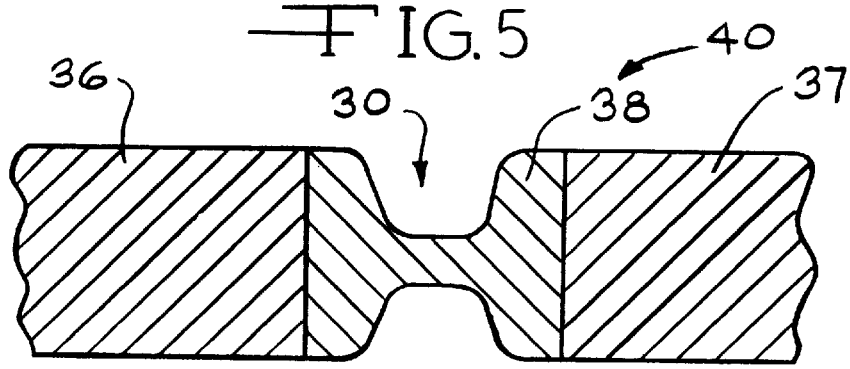
FIG. 6
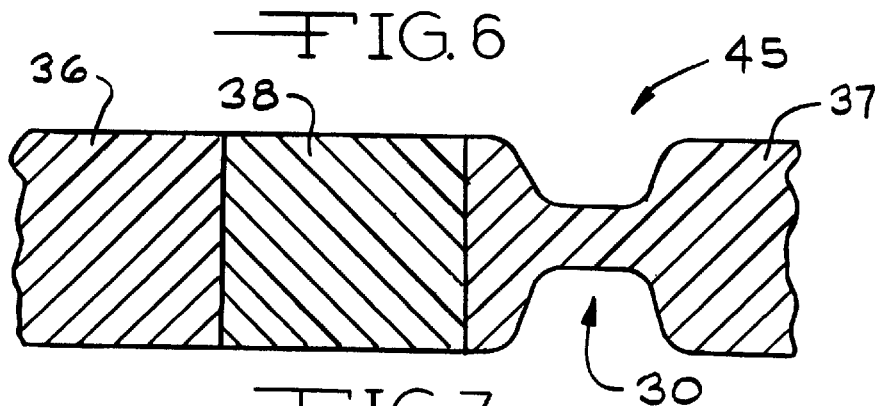
FIG. 7

SELF FUSING SOLENOID COIL

CROSS REFERENCE TO RELATED APPLICATIONS

This application claims the benefit of U.S. Provisional Application No. 60/033,688, filed Dec. 19, 1996.

BACKGROUND OF THE INVENTION

This invention relates in general to solenoid coils and in particular to a self-fusing solenoid coil.

An Anti-lock Brake System (ABS) is often included as standard or optional equipment on new vehicles. When actuated, the ABS is operative to control the operation of some or all of the vehicle wheel brakes. A typical ABS includes a plurality of solenoid valves mounted within a control valve body and connected to the vehicle hydraulic brake system. Usually, a separate hydraulic source, such as a motor driven pump, is included in the ABS for reapplying hydraulic pressure to the controlled wheels during an ABS braking cycle. An ABS further includes an electronic control module which is electrically connected to the pump motor, a plurality of solenoid coils associated with the solenoid valves, and wheel speed sensors for monitoring the speed and deceleration of the controlled wheels. The electronic control module is typically mounted upon the control valve body. The assembled control valve body, motor and control module form a compact unit which is often referred to as an ABS control valve.

During vehicle operation, the ABS control module continuously receives wheel speed signals from the wheel speed sensors. The control module monitors the wheel speed signals for potential wheel lock-up conditions. When the vehicle brakes are applied and the control module senses an impending wheel lock-up condition, the control module is operative to actuate the pump motor and selectively operate the solenoid valves in the control valve to cyclically relieve and reapply hydraulic pressure to the controlled wheel brakes. The hydraulic pressure applied to the controlled wheel brakes is adjusted by the operation of the solenoid valves to limit wheel slippage to a safe level while continuing to produce adequate brake torque to decelerate the vehicle.

Typically, the solenoid valves are operated intermittently. This not only reduces the power demand of the ABS, but also allows use of smaller sized components.

SUMMARY OF THE INVENTION

This invention relates to a self-fusing solenoid coil.

If there should be a malfunction within an ABS electronic control module, a solenoid valve could remain energized, which would be undesirable since the operation of the ABS would be adversely affected. Additionally, the continued supply of electricity to the solenoid coil could cause the coil to overheat and damage the coil and other components contained in the ABS electronic control module. It is known to include an electromechanical relay in the control module to interrupt the coil current in the event of such a control module malfunction. However, it would be desirable to provide a simpler protection against a continued supply of current to a solenoid coil due to a malfunction within the electronic control module.

The present invention is directed toward a solenoid coil having a winding formed from a piece of wire adapted to receive an electrical current which flows through the winding. The winding including a current limiting device which causes an interruption in the current after a predetermined current flows through the winding for a predetermined period of time.

It is contemplated that the coil wire has a first cross sectional area and that the current limiting device includes a second cross sectional area which is less than the first cross sectional area. Accordingly, the second cross sectional area has a resistance per unit length which is greater than the resistance per unit length of the remainder of the wire. The greater resistance of the second cross sectional area the wire included therein to increase in temperature. The size of the second cross sectional area is selected to cause the predetermined current to melt the wire after the predetermined time period has elapsed. The melted wire interrupts the current flow through the coil. In the preferred embodiment, the second cross sectional area is formed by a crimp in the winding wire.

Alternately, the winding wire can include a first portion which is formed from a first material having a first resistivity while the current limiting device includes a second portion of the wire formed from a second material having a second resistivity which is greater that the first resistivity. The resistivity of the second portion of the wire is selected to cause the predetermined current to melt the second portion of the wire after the predetermined time period has elapsed.

It is further contemplated that the current limiting device can include both a reduced cross sectional area and a portion formed from a material having a higher resistivity. The current limiting device can be formed in one of the turns of the winding or in a free standing end of the winding.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a further enlarged sectional view of a portion of FIG. 2.

FIG. 4 is a sectional view taken along line 4—4 in FIG. 3.

FIG. 5 is an alternate embodiment of the device illustrated in FIG. 4.

FIG. 6 is another alternate embodiment of the device illustrated in FIG. 4.

FIG. 7 is another alternate embodiment of the device illustrated in FIG. 4.

DETAILED DESCRIPTION OF THE PREFERRED EMBODIMENT

Figure 1:
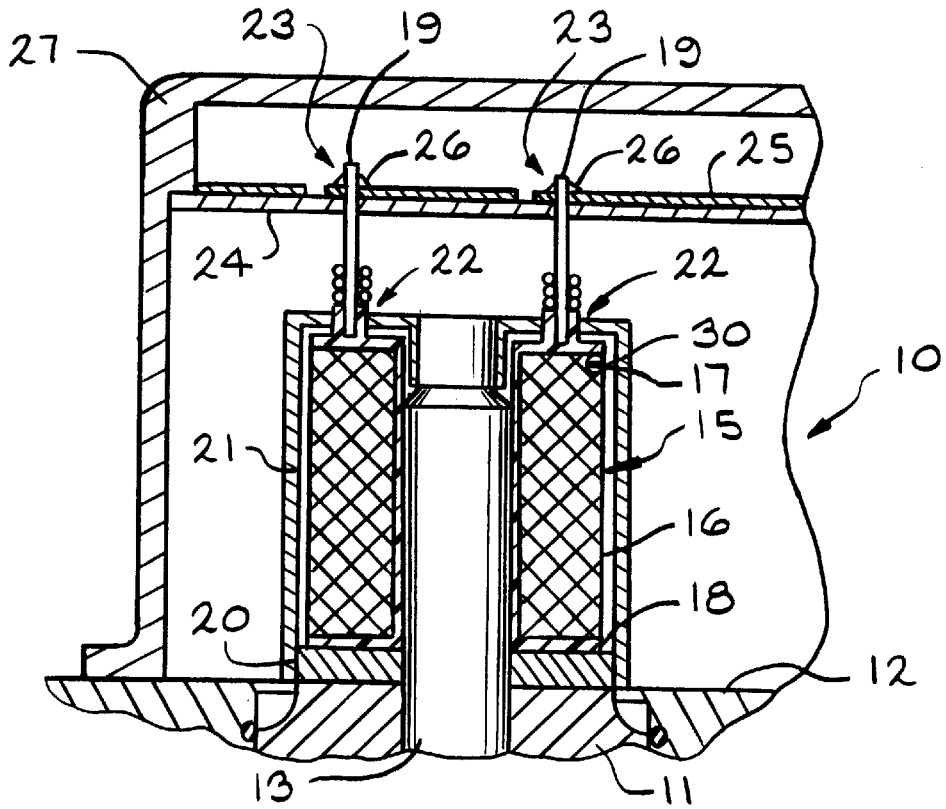
FIG. 1 is a partial sectional view of a portion of an ABS control valve illustrating a solenoid coil.
Figure 2:
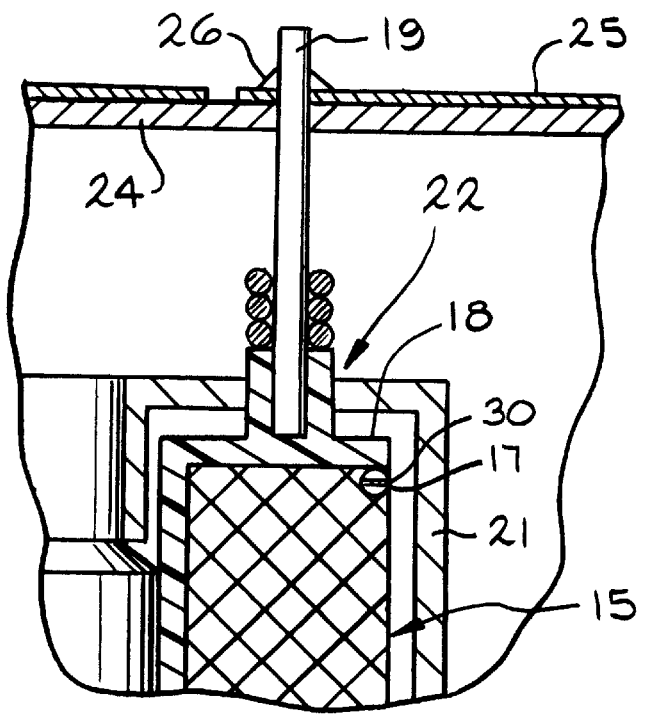
FIG. 2 is an enlarged view of a portion of FIG. 1.

Referring now to the drawings, there is illustrated in FIG. 1 a partial sectional view of a portion of a typical ABS control valve 10. The control valve 10 includes a plurality of solenoid valves 11 (one shown) mounted in a valve body 12. Each of the solenoid valves 11 has a valve sleeve 13 which extends in an upward direction in FIG. 1 from the upper surface of the valve body 12. Each valve sleeve 13 encloses an axially movable solenoid armature (not shown) which carries a valve ball on one end. The valve sleeves 13 prevent loss of hydraulic fluid from the control valve 10 and the associated vehicle hydraulic brake circuit (not shown).

Each valve 11 also includes a solenoid coil 15. As illustrated in FIG. 1, the coil 15 includes a winding 16 comprising a plurality of turns 17 of fine magnet wire wound upon a bobbin 18. The ends of the magnet wire are wound onto a pair of rigid terminal leads 19 which extend in an upward direction from the coil 15. An annular flux ring 20 is disposed between the coil 15 and the valve 11. A cylindrical flux casing 21 encloses the coil 15. Both the flux ring 20 and flux casing 21 are formed from a metal having a low magnetic reluctance, such as steel. A pair of casing lead apertures 22 are formed through the upper end surface of the flux casing 21. The terminal leads 19 extend through the casing lead apertures 22 and through a second pair of apertures 23 formed through a Printed Circuit Board (PCB) 24. The PCB 24 has electrical traces 25 formed upon its upper surface. The terminal leads 19 are electrically connected to the traces 25 by a solder connection 26. Thus, the terminal leads 19 provide an electrical connection between the coil magnet wire and the PCB traces 25 and a mechanical connection between the PCB 24 and the coil 15.

A housing 27 encloses the solenoid coils 15 and the PCB 24. The PCB 24 is typically attached to the housing 27. The housing 27 is removably attached to the valve body 12. Accordingly, the housing 27 with the PCB 24 and coils 15 can be removed as unit from the valve body 12 for servicing without breaching the vehicle hydraulic brake circuit.

During operation of the ABS, electricity is supplied through the electrical traces 25 and coil leads 19 to the coil 15. The current flowing through the coil 15 generates a magnetic flux field causes the valve armature to shift axially within the valve sleeve 13. The shifting of the valve armature actuates the solenoid valve 11. The flux ring 20 and flux casing 21 cooperate to provide a low reluctance return path for the magnetic flux field.

The present invention contemplates including a discontinuity in the magnet wire forming the solenoid coil 15 to form a localized area of higher resistance in the winding 16. In the preferred embodiment, a crimp 30 is formed in the magnet wire as the wire is wound onto the bobbin 18. The crimp 30 which is included in one of the coil turns 17 in FIG. 1 functions as a fusible link. In the preferred embodiment, the wire is stretched while being crimped to maintain a uniform diameter on both sides of the crimp 30. Thus, the crimp 30, which is best seen in FIGS. 3 and 4, is formed without a corresponding increase in the diameter of the coil wire. However, the cross sectional area of the coil magnet wire at the crimp 30 is reduced. The resistance, R, of a length of wire, l, is defined by the relationship:

$$R = \rho(l/A)$$

Where $\rho$ is the resistivity of the material forming the wire and A is the cross-sectional area of the wire. Accordingly, the resistance of a portion of the winding wire is inversely proportional to the cross-sectional area of the wire. Thus, the reduced cross section area of the crimp 30 increases the resistance of the portion of coil turn 17 which includes the crimp 30.

When a current flows through the winding 16, the internal resistance of the coil turns 17 generates heat. The heat is proportional to the internal resistance of the wire multiplied by the square of the current flowing through the wire. The crimp 30, having a greater resistance due to its reduced cross-sectional area, generates additional heat. The cross sectional area of the crimp 30 is selected to have an internal resistance which is sufficient to cause the expected current to generate enough heat, after a predetermined time period has elapsed, to melt the portion of the wire within the crimp 30. Generally, the narrower the crimp 30, the shorter the elapsed time before the crimped wire melts. The crimp width is selected to provide a predetermined time period which exceeds the normal actuation duration for the associated solenoid but is less than a time period which would result in overheating damage to the electrical components in the electronic control unit. Thus, the crimp 30 functions similar to a fusible link. A safety factor is included to allow for transient over current conditions and valve response delays.

Once the wire within the crimp 30 has melted, the current path through the winding 16 is opened and the current flow is interrupted. Accordingly, the associated solenoid valve 11 is deactivated. Thus, the coil 15 having the crimped solenoid turn 17 functions as a fail-safe device. Because the coil 15 goes to an open circuit state upon occurrence of a malfunction, a default condition, which does not inhibit any foundation brake function, is assured for the associated solenoid valve 11. Typically, the ABS control module includes self-monitoring subroutines which will detect the default condition for the solenoid valve and illuminate a warning lamp to alert the vehicle operator that the ABS requires servicing. Additionally, the open circuit state prevents potential overheating of the other electronic components within the ABS control module from a continuing current flow through the coil winding 16. Accordingly the need for an electromechanical relay is eliminated. The resulting decrease in complexity is expected to increase the reliability of the ABS control module while reducing the manufacturing cost thereof.

While the invention has been described and illustrated above as including a crimped winding wire, it will be appreciated that the invention also can be practiced with a reduced cross sectional area formed in the winding wire by other conventional methods.

An alternate embodiment of the invention is illustrated in FIG. 5 where a portion of winding turn 35 is shown. The winding turn 35 is formed from a wire having first and second portions labeled 36 and 37, respectively, formed from a material having a first resistivity, $\rho_1$. It is contemplated that the material having the first resistivity $\rho_1$ forms the bulk of the winding 16. A third portion 38 of the wire, which has a relatively short length, is included between the first and second portions 36 and 37. The third portion 38 has a second resistivity, $\rho_2$, which is greater than the first resistivity $\rho_1$. As shown in FIG. 5, the diameters of the first, second and third portions 36, 37 and 38 of the wire are the same. The second resistivity $\rho_2$ is selected to provide an internal resistance for the third portion 38 which is sufficient to cause the expected coil current to generate enough heat, after a predetermined time period has elapsed, to melt the third portion 38 of the wire. Accordingly, the third portion 38 of the wire functions similarly to a fusible link.

Another alternate embodiment is illustrated in FIG. 6, where components which are similar to components shown in FIG. 5 are identified by the same numerical designators. Similar to FIG. 5, a winding turn 40 includes two materials having different resistivities. The material forming the center portion 38 has a greater resistivity than the resistivity of the material forming the other portions 36 and 37 of the turn 40. Additionally, a crimp 30 is formed in the center portion 38 to further increase the resistance thereof. Thus, the winding 40 has a structure which includes both of the structures shown in FIGS. 4 and 5. Using both a crimp 30 and a greater resistivity increases the possible range of application.

While FIG. 6 shows the higher resistivity material crimped, it will be appreciated that the invention also can be practiced with the crimp formed in the lower resistivity material, as illustrated by another embodiment 45 of the invention shown in FIG. 7.

Figure 8:
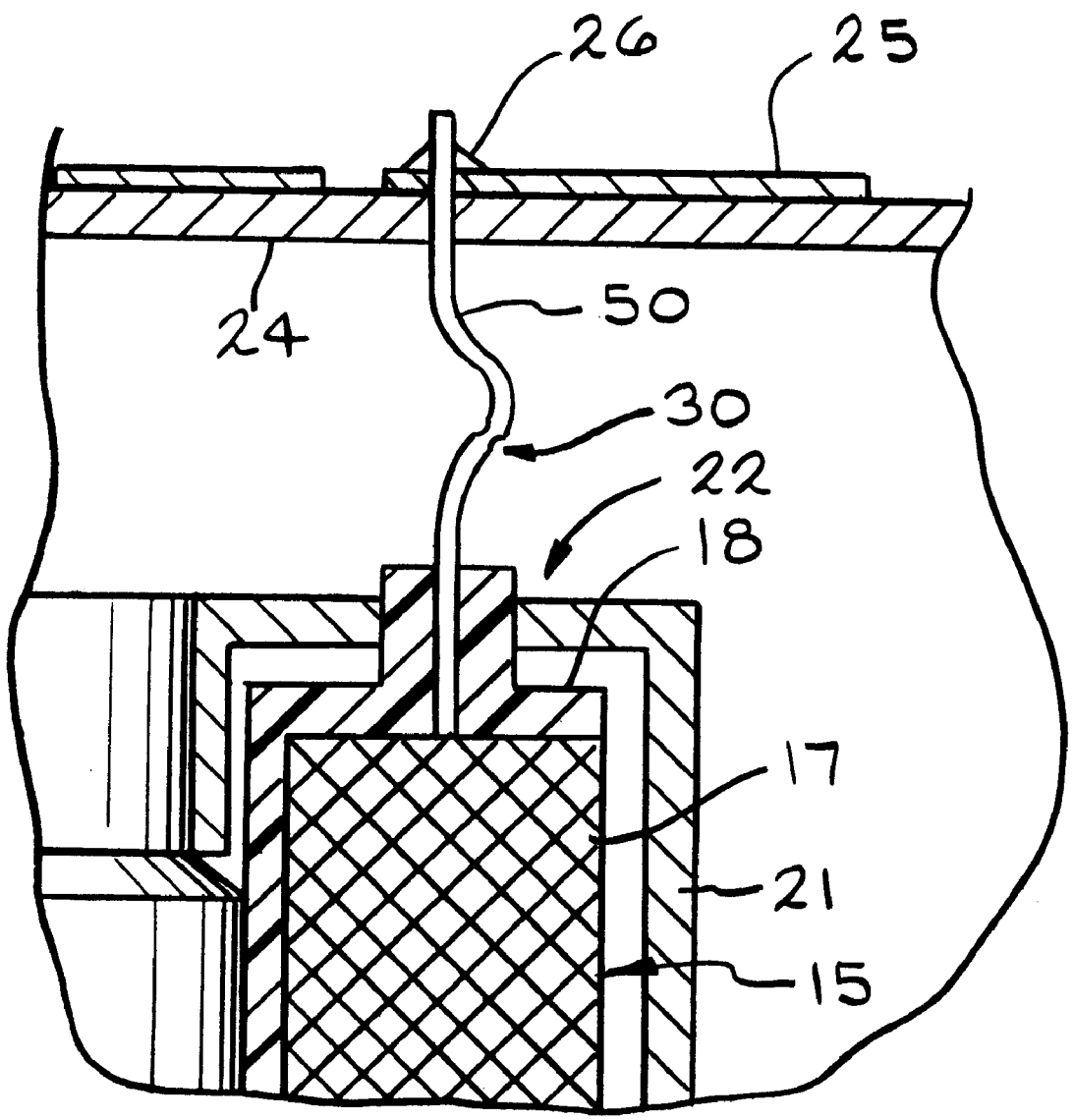
FIG. 8 is an alternate embodiment of the solenoid coil shown in FIG. 1.

The present invention also contemplates an alternate embodiment for coils having free standing wire terminations 50, as illustrated in FIG. 8. As above, components in FIG. 8 which are similar to components shown in FIGS. 1 through 4 have the same numerical designators. For such coils, the winding wire ends extend from the bobbin 18 as free standing wire terminations 50 and are electrically connected directly to the circuit on the PCB. The flexibility of the free standing wire terminations 50 compensates for stack up of tolerances of the components included in the electronic control unit. In the alternate embodiment, a crimp 30 is formed in one of the free standing wire terminations 50 and functions as described above. It will be appreciated that, while a crimp 30 has been shown in FIG. 8, the invention also can be practiced with an length of higher resistivity material included in one of the free wire terminations (not shown) as described above. Similarly, both a length of higher resistivity material and a crimp can be included in the free standing wire termination (not shown) as illustrated in FIGS. 6 and 7.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the invention has been described and illustrated as monitoring the operation of a solenoid valve in an anti-lock brake system, it will be appreciated that the invention can be used to monitor operation of solenoid valves in other devices, such as, for example, traction control and vehicle stability systems.

What is claimed is:

1. A current protected solenoid coil comprising:
   a winding formed from a continuous piece of wire, said wire adapted to receive an electrical current, said current flowing through said winding; and
   a current limiting device formed as an integral portion of said winding wire, said current limiting device causing an interruption in said current flowing through said winding after a predetermined current flows through said winding for a predetermined period of time.

2. A coil according to claim 1 wherein said piece of wire forming said winding has a first cross sectional area and further wherein said current limiting device includes a portion of said wire having a second cross sectional area which is less than said first cross sectional area.

3. A coil according to claim 2 wherein said portion of said wire having said second cross sectional area includes a crimp.

4. A coil according to claim 2 wherein said portion of said wire having said second cross sectional area has an increased resistance whereby said current interruption is caused by said portion of said wire melting after said predetermined current flows through said portion of said wire for said predetermined time period.

5. A coil according to claim 4 wherein said current limiting device is formed in a turn of said winding.

6. A coil according to claim 4 wherein said wire extends from said winding to form a free standing wire end and further wherein said current limiting device is formed in said free standing wire end.

7. A coil according to claim 2 wherein said current limiting device also includes a portion of said wire which is formed from a material having a resistivity which is greater than the resistivity of the remainder of said wire.

8. A coil according to claim 7 wherein said second cross sectional area and said greater resistivity increase the resistance of a portion of said wire sufficiently that said current interruption is caused by said portion of said wire melting after said predetermined current flows through said portion of said wire for said predetermined time period.

9. A coil according to claim 8 wherein said reduced cross sectional area is formed in said portion of said wire having said greater resistivity material.

10. A coil according to claim 8 wherein said current limiting device is formed in a turn of said winding.

11. A coil according to claim 8 wherein said winding wire extends from said winding to form a free standing wire end and further wherein said current limiting device is formed in said free standing wire end.

12. A coil according to claim 10 wherein the coil is included in a solenoid valve.

13. A coil according to claim 12 wherein said solenoid valve is included in an anti-lock brake system.

14. A coil according to claim 1 wherein said current limiting device includes a portion of said continuous wire which is formed from a material having a resistivity which is greater than the resistivity of the remainder of said continuous wire whereby said current interruption is caused by said portion of said wire melting after said predetermined current flows through said portion of said wire for said predetermined time period.

15. A coil according to claim 14 wherein said current limiting device is formed in a turn of said winding.

16. A coil according to claim 14 wherein said wire extends from said winding to form a free standing wire end and further wherein said current limiting device is formed in said free standing wire end.

17. A coil according to claim 14 wherein said wire has first a cross sectional area and further wherein said current limiting device includes a portion of said wire having a second cross sectional area which is less than said first cross sectional area.

18. A coil according to claim 17 wherein said second cross sectional area and said greater resistivity increase the resistance of a portion of said wire sufficiently that said current interruption is caused by said portion of said wire melting after said predetermined current flows through said portion of said wire for said predetermined time period.

19. A coil according to claim 18 wherein said current limiting device is formed in a turn of said winding.

20. A coil according to claim 18 wherein said winding wire extends from said winding to form a free standing wire end and further wherein said current limiting device is formed in said free standing wire end.

21. A coil according to claim 19 wherein the coil is included in a solenoid valve.

22. A coil according to claim 21 wherein said solenoid valve is included in an anti-lock brake system.

* * * * *